Dec. 13, 1932.   W. H. DE WITT   1,890,804
FIRE CONTROL FOR FILM UTILIZING MACHINES
Filed May 5, 1931   2 Sheets-Sheet 2
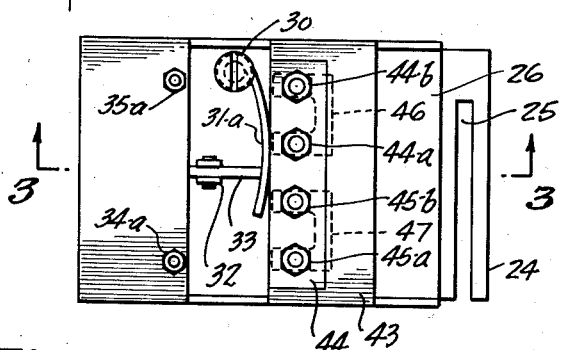
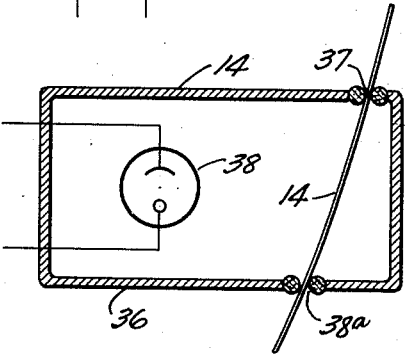
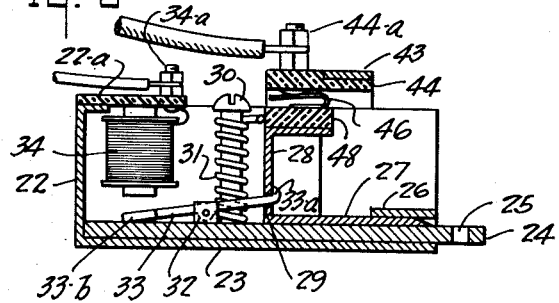
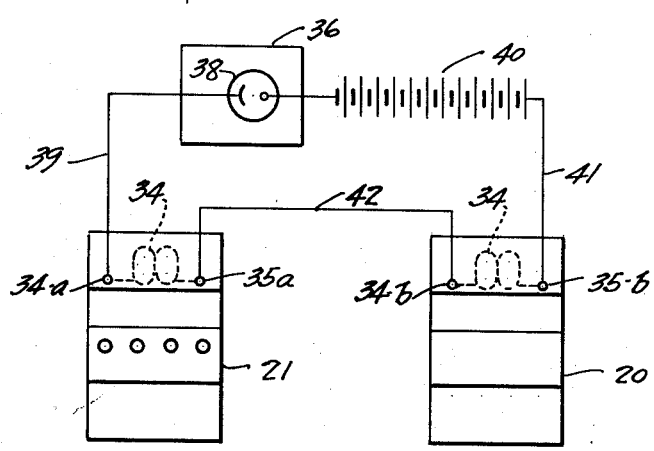
INVENTOR
William H. De Witt
BY
Westall and Wallace
ATTORNEYS Patented Dec. 13, 1932

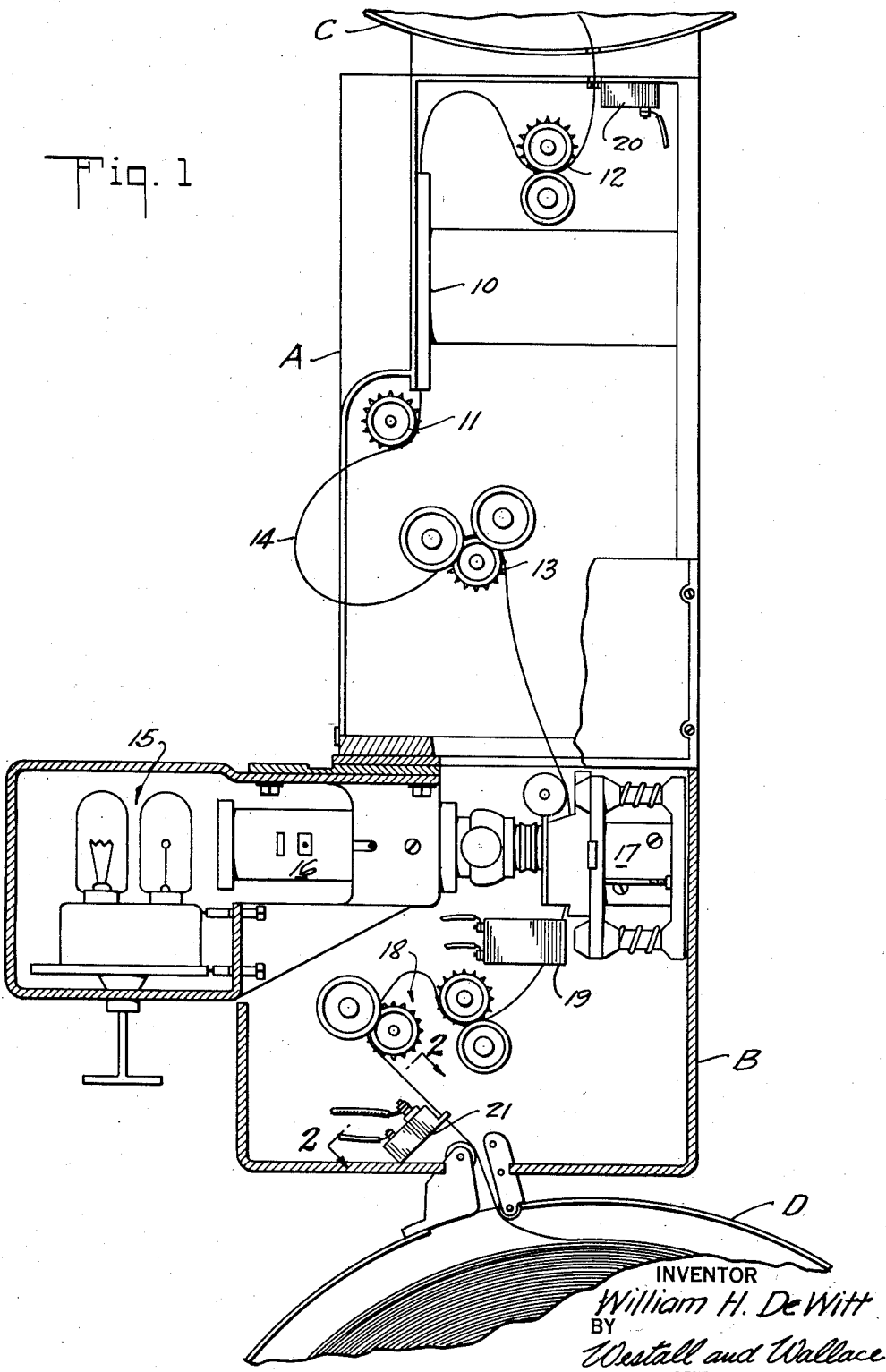

1,890,804

UNITED STATES PATENT OFFICE

WILLIAM H. DE WITT, OF LOS ANGELES, CALIFORNIA, ASSIGNOR OF ONE-HALF TO
J. GLENN MARKS, OF LOS ANGELES, CALIFORNIA

FIRE CONTROL FOR FILM UTILIZING MACHINES

Application filed May 5, 1931. Serial No. 535,189.

This invention relates to a system for utilizing the inflammation of a travelling strip to effect action thereon. It has a specific application to inflammable film such as is used in motion pictures. Such film for whatever purpose used, that is, as sound records, optical records or both, employ a supply magazine and take up magazine for reels from and upon which the film is wound and a case intermediate the magazine wherein the film is acted upon for projection or photographing depending upon whether the machine is a projector or camera. The hazard of film becoming ignited and due to its inflammable character burning in the magazines has not been adequately met. As far as applicant is aware, actuation of such protective devices upon inflammation of the film as have heretofore been proposed are dependent upon either the operator or thermal responsive means. Due to the speed of inflammation such devices have not proved satisfactory.

The present invention relates to a system wherein the light accompanying inflammation acts upon a light responsive cell which controls operation of means to shield the film from burning in the magazines.

These objects together with other objects and corresponding accomplishments are obtained by means of the embodiment of my invention illustrated in the accompanying drawings, in which:—

Fig. 1 is a vertical section through a projector embodying my invention, the electrical circuit of the fire control not being shown; Fig. 2 is a plan view of a film cutter unit; Fig. 3 is a section as seen on the plane denoted by 3—3 of Fig. 2; Fig. 4 is a section through the control box showing the light sensitive cell by a conventional symbol; and Fig. 5 is a wiring diagram of the electrical circuit.

Referring more particularly to Fig. 1, A indicates a projector head of a conventional type. A sound head B is shown below the projector head and is of a well known type. A fragment of the upper magazine is denoted by C and forms the supply magazine for film which is passed through the projector head and the sound head to a lower or take up magazine D. In the projector head is a framer marked 10, intermittent motion mechanism indicated by 11 and sprockets 12 and 13. The details of the projector head are not pertinent to the present invention except that an inflammable film 14 is passed therethrough from the upper magazine to the sound head. In the sound head are exciter lamps 15, a lens system 16 and a photo conductive cell unit 17. There is a sprocket set indicated generally by 18 for directing the film 14 to the lower magazine D. Within the sound head is a fire control unit 19 through which the film 14 is passed.

Within the projector head and at the film entrance opening is an electromechanical cutter 20. In the sound head at the film exit opening is an electromechanical cutter 21 of like construction to cutter 20. As these cutters are alike, only one will be described.

Referring to a cutter, it comprises a frame 22 having a plate base 23 upon which is mounted a film holder 24 having a slit 25 through which the film passes. A guide strap 26 is spaced from plate 24 and slidably mounted between the two is a knife 27 having an upstanding tail 28 provided with a keeper aperture 29. The knife 27 is slidable across the slit 25 so that it may cut any film therein. A post 30 upstanding from the base of the frame has a helical spring 31 mounted thereon, the upper end of the spring engaging a part of the frame and the lower end 31a engaging the knife and tending to project the latter so as to cut the film. Upstanding from the base are ears 32, between which is pivoted a trigger 33 having a hook end 33a to engage tail 28 and an armature 33b for coaction with electromagnets. The arrangement is such that the knife may be retracted to the position shown in Figs. 2 and 3 with the trigger 33 extending through the keeper aperture 29 and engaging the tail of the knife so that upon raising the trigger, the knife will be released and will be projected by the spring 31 and will effect cutting of film which is passed through slit 25.

An electromagnet 34 is suspended from a plate 22a secured to the frame 22 and has its core overhanging the armature 33b of the trigger. The knife having been set as shown in Figs. 2 and 3, energization of the electromagnet 34 will cause the trigger to be swung and the knife released for cutting. Binding posts 34a and 35a are provided for connection of the winding of the electromagnet to the circuit.

The fire control unit 19 is shown more in detail in Fig. 4 and comprises a dark box 36 having ports 37 and 38a with marginal rollers through which the film 14 is passed. In the dark box is a photo conductive cell such as a selenium cell indicated conventionally by 38. The arrangement is such that the lamp 38 will have its electrical conductance increased upon light from the film engaging the lamp.

Referring more particularly to Fig. 5, binding post 34a of one cutter is connected by a wire 39 to one terminal of lamp 38. The other terminal of lamp 38 is connected to a source of electrical energy 40 which is shown as a battery of electrical cells. The other terminal of the battery 40 is connected by a wire 41 to a binding post 35b of the other cutter. Binding posts 35a and 34b of the cutter are connected by a wire 42. If the film 14 becomes ignited, the fire will travel through the dark box 36 of the fire control unit 19 and the light will act upon the photo conductive cell 38, enabling the battery 40 to energize the electromagnets in the cutters and thereby release the knives so as to cut the film both at the entrance opening of the projector head and the exit opening of the sound head, confining the inflamed film to the heads and shielding the film in the magazines from inflammation.

It is desirable that the motor circuit for the machine be opened at the same time as the film is cut and also that the circuit to the lamps be opened. To this end, I have provided a switch for the motor circuit and a switch for the lamp circuit, both being operated by movement of the knife blade. Supported upon the frame 22 of a cutter and overhanging the knife is a bracket 43 having an insulating block 44 provided with a pair of contact buttons 44a and 44b and another pair of contact buttons 45a and 45b. Buttons 44a and 44b are connected to the motor circuit to control the latter and buttons 45a and 45b are connected to the lamp circuit. A spring contact 46 is mounted upon an insulating block 48 and is secured to the knife blade 27 to be operated thereby and is adapted to make contact with buttons 44a and 44b in the positions shown in Figs. 2 and 3 and close the motor circuit. Upon projection of the knife, the motor circuit is broken. Similarly, spring contact on member 47 coacts with buttons 45a and 45b to make and break the lamp circuit.

What I claim is:—

1. A fire controlled system for action upon an inflammable travelling strip comprising in combination an inflammable strip, a dark box having openings for the passage therethrough of said strip, a light sensitive cell subject to light rays derived from inflammation of said strip within said box, electromechanical means to act upon said strip upon inflammation of the latter; a circuit containing a source of electrical energy, said cell and said electromechanical means whereby upon inflammation of said strip said electromechanical means is operated.

2. A fire controlled system for action upon an inflammable film comprising in combination an inflammable film, a dark box having ports for the passage therethrough of said film, a light sensitive cell within said box subject to light rays derived from inflammation of said film therein, electromechanical means including a knife to cut said film upon inflammation of the latter; a circuit containing a source of electrical energy, said cell and said electromechanical means whereby upon inflammation of said film said electromechanical means is operated.

3. In a motion picture machine utilizing a magazine for film, a fire controlled system for action upon an inflammable film comprising in combination an inflammable film, a dark box beyond said magazine having openings for the passage therethrough of said film, a light sensitive cell subject to light rays derived from inflammation of said film within said box, electromechanical means to act upon said film upon inflammation of the latter; a circuit containing a source of electrical energy, said cell and said electromechanical means whereby upon inflammation of said film said electromechanical means is operated.

4. In a motion picture machine utilizing a magazine for film; a fire controlled system for action upon an inflammable travelling film comprising in combination an inflammable film, a fire controlled unit outside of said magazines including a dark box having openings for the passage therethrough of said film, a light sensitive cell disposed within said box subject to light rays derived from inflammation of said film therein, electromechanical means including a knife to sever said film at a point between said box and magazine upon inflammation of the film; a circuit containing a source of electrical energy, said cell and said electromechanical means whereby upon inflammation of said film said electromechanical means is operated to cause said knife to sever said film.

5. In a motion picture machine utilizing a head, supply and take up magazines; a fire controlled system for action upon an inflammable film comprising in combination an inflammable film, a dark box disposed within said head having ports for the passage therethrough of said film, a light sensitive cell within said box subject to light rays derived from inflammation of said film therein, electromechanical cutters including knives to sever said film, said cutter being disposed between a magazine and said box, one for each magazine; a circuit containing a source of electrical energy, said cell and said electromechanical cutters whereby upon inflammation of said film said electromechanical cutters are operated to sever said film at the magazines.

In witness that I claim the foregoing I have hereunto subscribed my name this 25 day of March, 1931.

WILLIAM H. DE WITT.